United States Patent
Chang et al.

(10) Patent No.: US 12,245,307 B2
(45) Date of Patent: Mar. 4, 2025

(54) CONTROL METHOD IN USER EQUIPMENT AND USER EQUIPMENT

(71) Applicant: SHARP KABUSHIKI KAISHA, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 169 days.

(21) Appl. No.: 17/053,599

(22) PCT Filed: May 7, 2019

(86) PCT No.: PCT/CN2019/085832
§ 371 (c)(1),
(2) Date: Nov. 6, 2020

(87) PCT Pub. No.: WO2019/214606
PCT Pub. Date: Nov. 14, 2019

(65) Prior Publication Data
US 2021/0235531 A1    Jul. 29, 2021

(30) Foreign Application Priority Data

May 9, 2018   (CN) .......................... 201810440467.6

(51) Int. Cl.
*H04W 76/25*     (2018.01)
*H04W 8/08*      (2009.01)
(Continued)

(52) U.S. Cl.
CPC ............. *H04W 76/19* (2018.02); *H04W 8/08* (2013.01); *H04W 60/04* (2013.01); *H04W 76/25* (2018.02); *H04W 80/02* (2013.01)

(58) Field of Classification Search
CPC ....... H04W 76/19; H04W 8/08; H04W 60/04; H04W 76/25; H04W 80/02; H04W 76/10
See application file for complete search history.

(56) References Cited

U.S. PATENT DOCUMENTS 10,631,358 B1    4/2020  Fang et al.
2016/0353511 A1*  12/2016  Gunnarsson .......... H04W 76/19
(Continued)

FOREIGN PATENT DOCUMENTS

CN        101848536 A       9/2010
EP         3836729 A1 *     6/2021  ............ H04W 76/27

OTHER PUBLICATIONS

Ericsson (NR Re-establishment procedure, R2-1801010, Jan. 2018).*
(Continued)

*Primary Examiner* — Lakeram Jangbahadur
(74) *Attorney, Agent, or Firm* — ScienBiziP, P.C.

(57) ABSTRACT

The present disclosure provides a control method in user equipment and user equipment. The control method in user equipment includes: transmitting, to a base station, a Radio Resource Control (RRC) connection reestablishment request message for requesting RRC connection reestablishment; receiving an RRC connection reestablishment response message transmitted by the base station as a response to the RRC connection reestablishment request message; when the RRC connection reestablishment response message indicates that RRC connection reestablishment is performed, a UE RRC layer performs an RRC connection reestablishment operation; and when the RRC connection reestablishment response message is an RRC connection establishment message used to instruct the UE to establish a new RRC connection, the UE RRC layer performs an RRC connection establishment operation, and a UE NAS layer initiates an NAS connection recovery procedure.

2 Claims, 2 Drawing Sheets

(51) Int. Cl.
H04W 60/04 (2009.01)
H04W 76/19 (2018.01)
H04W 80/02 (2009.01)

(56) References Cited

U.S. PATENT DOCUMENTS

2018/0083688 A1    3/2018   Agiwal et al.
2018/0278357 A1*   9/2018   Kim ................. H04J 11/0076
2019/0037625 A1*   1/2019   Shih ................. H04W 76/15

OTHER PUBLICATIONS

Ericsson805 (NR re-establishment, R2-1804805, Apr. 2018).*
Ericsson, "NR re-establishment (TP to 38.331)", R2-1804805, 3GPP TSG-RAN WG2 #101bis, Sanya, P.R. of China, Apr. 16-20, 2018.
Ericsson, "NR Re-establishment procedure", R2-1801010, (Resubmission of R2-1713389), 3GPP TSG-RAN WG2 NR AH1801, Vancouver, Canada, Jan. 22-26, 2018.
NTT Docomo, "New SID Proposal: Study on New Radio Access Technology", RP-160671, 3GPP TSG RAN Meeting #71, Göteborg, Sweden, Mar. 7-10, 2016.
Intel Corporation, "Reestablishment procedure for NR", R2-1805012 3GPP TSG RAN WG2 Meeting #101bis, Sanya, China, Apr. 16-20, 2018.
Ericsson, "CR on Connection Control ([101#37][NR] RRC procedures/messages)", R2-1805355 3GPP TSG-RAN WG2 #101Bis, Sanya, P.R. of China, Apr. 16-20, 2018.
Samsung, "Connection control messages, harmonised initial baseline", R2-1803098 3GPP TSG-RAN WG2 meeting #101, Athens, Greece, Feb. 27-Mar. 2, 2018.
Intel Corporation, "Email discussion report on [98#30][NR] RRC Connection Control", R2-1708799 3GPP TSG RAN WG2 Meeting #99, Berlin, Germany, Aug. 21-25, 2017.

* cited by examiner

CONTROL METHOD IN USER EQUIPMENT AND USER EQUIPMENT

TECHNICAL FIELD

The present disclosure relates to the field of wireless communications technologies. More specifically, the present disclosure relates to a control method in user equipment and corresponding user equipment.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

In the NR system, when a Radio Resource Control (RRC) connection failure happens, a User Equipment (UE) side can recover the RRC connection through an RRC reestablishment procedure. A conclusion reached at the 3GPP RAN2 #101bis meeting is as follows: in an RRC connection reestablishment procedure, when an RRC message transmitted by UE for an RRC reestablishment request is received, if a network side cannot complete RRC reestablishment because, for example, the network side does not have UE context information, then the network side can reply an RRC connection establishment message to the UE so as to establish a new RRC connection. The present disclosure provides a solution related to how the UE performs establishment of a new RRC connection in this procedure.

SUMMARY OF INVENTION

The objective of the present disclosure is to provide a solution related to the problem of how UE performs establishment of a new RRC connection in an RRC connection reestablishment procedure. Specifically, the present disclosure provides a control method related to an RRC connection reestablishment procedure in user equipment and corresponding user equipment.

According to a first aspect of the present disclosure, a control method in user equipment is provided, comprising: transmitting, to a base station, a Radio Resource Control (RRC) connection reestablishment request message for requesting RRC connection reestablishment; receiving an RRC connection reestablishment response message transmitted by the base station as a response to the RRC connection reestablishment request message; when the RRC connection reestablishment response message indicates that RRC connection reestablishment is performed, a UE RRC layer performs the RRC connection reestablishment operation; and when the RRC connection reestablishment response message is an RRC connection establishment message used to instruct the UE to establish a new RRC connection, the UE RRC layer performs an RRC connection establishment operation, and a UE NAS layer initiates an NAS connection recovery procedure.

In the aforementioned control method, the RRC connection establishment operation comprises at least one of the following operations: operation 1: stopping a running RRC timer; operation 2: releasing all radio resources; operation 3: indicating to the UE NAS layer that the RRC connection reestablishment has fallen back, that is, instructing establishment of a new RRC connection; operation 4: resetting a MAC layer; operation 5: applying configurations comprised in the RRC connection establishment message; operation 6: constructing an RRC connection establishment complete message and submitting the RRC connection establishment complete message to a lower layer for transmission, wherein the RRC connection establishment complete message is used to acknowledge/respond to the received RRC connection establishment message; and operation 7: performing an operation of leaving an RRC connected state.

In the aforementioned control method, after the UE RRC layer indicates to the UE NAS layer that the RRC connection reestablishment has fallen back, the UE NAS layer initiates the NAS connection recovery procedure.

In the aforementioned control method, during reception of the RRC connection establishment message and transmission of the RRC connection establishment complete message, the UE remains in the RRC connected state.

In the aforementioned control method, when the UE receives the RRC connection establishment message, the UE enters an RRC idle state; after the configurations comprised in the RRC connection establishment message are applied (operation 5) or the UE RRC layer receives NAS information from the UE NAS layer, the UE enters the RRC connected state.

In the aforementioned control method, when the UE NAS layer receives an indication from the UE RRC layer for indicating that the RRC connection reestablishment has fallen back, the UE enters an NAS idle state, and initiates an NAS connection recovery procedure.

In the aforementioned control method, if the NAS connection recovery procedure results from reception of the indication from the UE RRC layer for indicating that the RRC connection reestablishment has fallen back, or reception of an indication from the UE RRC layer for requesting establishment of a new RRC connection, or reception of an indication from the UE RRC layer for indicating that a new RRC connection has been established, then the UE NAS layer does not provide an RRC connection establishment cause and/or access control information to the UE RRC layer.

In the aforementioned control method, after the RRC connection reestablishment has fallen back, if an RRC connection establishment cause and/or access control information is received from the UE NAS layer, then the UE RRC layer discards the received RRC connection establishment cause and/or access control information.

In the aforementioned control method, after the UE NAS layer completes the NAS connection recovery procedure, an RRC connection establishment complete message is constructed and submitted to a lower layer for transmission, wherein the RRC connection establishment complete message is used to acknowledge/respond to the received RRC connection establishment message.

According to a second aspect of the present disclosure, User Equipment (UE) is provided, comprising: a processor; and a memory, storing instructions, wherein when run by the processor, the instructions execute the control methods described herein.

BRIEF DESCRIPTION OF DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION OF EMBODIMENTS

Figure 1:
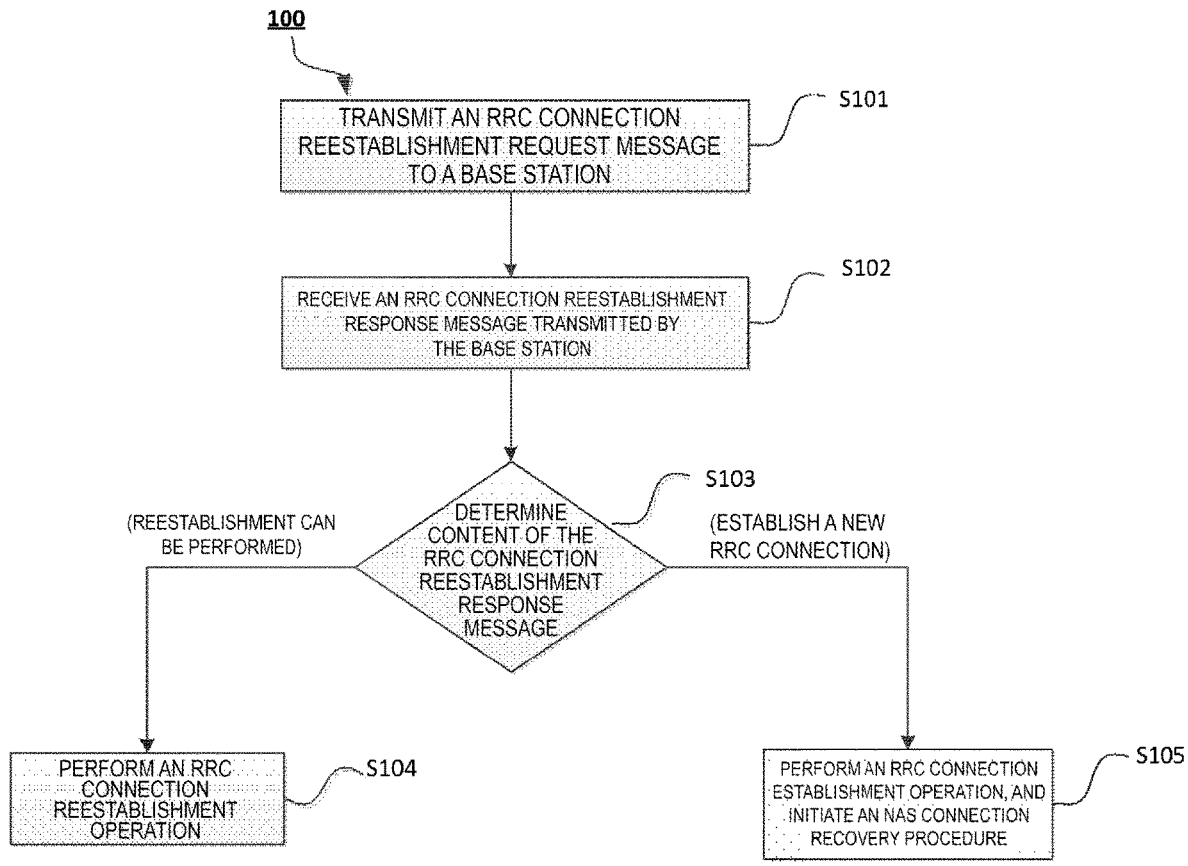
FIG. 1 shows a flowchart of a control method 100 in User Equipment (UE) according to an embodiment of the present disclosure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or."

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the figures.

A plurality of embodiments according to the present disclosure are specifically described below by using a long term/NR mobile communications system and its subsequent evolved versions as an exemplary application environment. However, it is to be noted that the present disclosure is not limited to the following embodiments, but may be applied to other wireless communications systems. If not otherwise specified, the concept of a cell and the concept of a base station are interchangeable in the present disclosure.

In a Long Term Evolution (LTE)/NR system, UE initiates an RRC connection reestablishment (RRC connection reestablishment) procedure to reestablishment an RRC connection thereof when one of the following conditions is satisfied:

Condition 1: a radio link failure is detected;
Condition 2: handover (namely, synchronization reconfiguration of a master cell group) fails;
Condition 3: mobility from Evolved Universal Terrestrial Radio Access (E-UTRA)/NR fails;
Condition 4: an integrity check failure indication is received from a lower layer; and
Condition 5: RRC connection reconfiguration fails.

In the present disclosure, an RRC message used by UE to request RRC connection reestablishment is referred to as an RRC connection reestablishment request message (in the NR system, this message may have other names; the present disclosure does not limit the name of this message, and the name herein is merely for ease of description). A cell in which UE triggers an RRC connection reestablishment procedure, such as a cell in which a radio link failure occurs, is referred to a source cell, and a cell in which UE transmits an RRC connection reestablishment request message is referred to as a target cell. A source cell and a target cell may be the same cell, or may be different cells. Only when UE context information is acquired and authenticated in a target cell can RRC connection reestablishment succeed.

In the LTE system, if RRC reestablishment of UE cannot succeed because, for example, a target cell does not have UE context information, then the target cell responds to the UE with an RRC connection reestablishment reject message, that is, an RRC connection reestablishment procedure fails. Upon receiving the reject message, the UE enters an RRC idle state, and a UE RRC layer transmits an RRC connection failure indication to a Non-Access Stratum (NAS), so as to trigger a UE NAS layer recovery procedure. In the UE NAS layer recovery procedure, an NAS layer generally initiates a tracking area update procedure to establish a new RRC connection and NAS connection.

In the NR system, in order to reduce the effect of a service interruption resulting from a delay caused by NAS layer recovery triggered by an RRC connection reestablishment failure, when RRC connection reestablishment cannot succeed, the target cell can respond to the UE with an RRC connection establishment message (RRC connection setup), that is, notify the UE to directly establish a new RRC connection. This method allows the UE to establish a new RRC connection more rapidly. In the present disclosure, this mechanism is referred to as a fallback mechanism, that is, UE falls back from RRC connection reestablishment to RRC connection establishment. In fact, a current LTE/NR system also supports a similar fallback mechanism, namely, a fallback mechanism in an RRC connection recovery procedure (RRC connection resume). In an RRC connection recovery procedure, UE transmits, to a network side, an RRC message (referred to as, for example, an RRC connection resume message) for requesting recovery of an RRC connection; if the network side cannot recover the RRC connection of the UE, then the network side can respond to the UE with an RRC connection establishment message to instruct the UE to establish a new RRC connection. However, fallback in the RRC connection reestablishment procedure is different from fallback in the RRC connection recovery procedure. Firstly, the former occurs in an RRC connected state (RRC connected), but the latter occurs in an RRC idle state (RRC idle) or RRC inactive state (RRC inactive), so that resulting UE behaviors are inevitably different. Secondly, the RRC connection reestablishment procedure is used to recover operation of a Signaling Radio Bearer 1 (SRB1), reactivate security, and so on; however, the RRC recovery procedure is used to recover all SRBs and Data Radio Bearers (DRBs) or perform Radio access network Notification Area Update. The fallback method in the RRC connection recovery procedure in the existing mechanism cannot be applied in the RRC connection reestablishment procedure.

The present disclosure provides a solution regarding how to implement a fallback mechanism in an RRC connection reestablishment procedure on UE, that is, how to establish a new RRC connection in the RRC connection reestablishment procedure.

In the following, a control method related to an RRC connection reestablishment procedure in User Equipment (UE) of the present disclosure is described. As an example, FIG. 1 shows a flowchart of a control method 100 for an RRC connection reestablishment procedure in User Equipment (UE) according to an embodiment of the present disclosure.

In step S101, the User Equipment (UE) transmits, to a base station, a Radio Resource Control (RRC) connection reestablishment request message for requesting RRC connection reestablishment.

In step S102, the User Equipment (UE) receives an RRC connection reestablishment response message transmitted by the base station as a response to the RRC connection reestablishment request message.

In step S103, determine, based on the received RRC connection reestablishment response message, content of the response message.

If it is determined in step S103 that "the RRC connection reestablishment response message indicates that RRC connection reestablishment is capable of being performed," then step S104 is executed, and in step S104, a User Equipment (UE) RRC layer performs an RRC connection reestablishment operation.

In addition, if it is determined in step S103 that "the User Equipment (UE) is instructed to establish a new RRC connection," then step S105 is executed, and in step S105, the User Equipment (UE) RRC layer performs an RRC connection establishment operation, and a User Equipment (UE) NAS layer initiates an NAS connection recovery procedure.

Furthermore, specific content of the aforementioned RRC connection establishment operation performed by the User Equipment (UE) RRC layer is described in detail in the following embodiments. In addition, the NAS connection recovery procedure initiated by the User Equipment (UE) NAS layer is also described in detail in the following embodiments.

Specific embodiments of the present disclosure are described in detail below. In addition, as described above, the embodiments of the present disclosure are exemplary descriptions for facilitating understanding of the present invention, and are not intended to limit the present invention.

Embodiment 1

This embodiment provides a fallback method in an RRC connection reestablishment procedure implemented by UE.

Step 1: a UE RRC layer initiates an RRC connection reestablishment procedure, and transmits, to a base station, an RRC message for requesting RRC connection reestablishment.

Step 2: the UE RRC layer receives an RRC connection establishment message transmitted by the base station as a response message, where the RRC connection establishment message is used to instruct the UE to establish a new RRC connection, that is, to establish an SRB1.

Step 3: when the RRC connection establishment message is received, the UE RRC layer performs one or more of the following operations:

Operation 1: stopping a running RRC timer.

Preferably, the RRC timer includes: a timer 301 for monitoring the RRC connection reestablishment procedure, a timer for access control, namely access barring, and the like. Alternatively, the RRC timer does not include a timer 320.

Operation 2: releasing all radio resources. The radio resources also include RRC configurations of the UE, preferably RRC configurations of the UE before the RRC connection reestablishment is initiated. Further, the releasing includes releasing Medium Access Control (MAC) configurations and releasing Radio Link Control (RLC) entities, Packet Data Convergence Protocol (PDCP) entities, and/or Service Data Adaptation Protocol (SDAP) entities associated with all established radio bearers. Alternatively, the releasing further includes releasing one or more of the following: physical layer specific configurations, measurement configurations, radio link monitoring configurations, beam failure monitoring configurations, logical channel configurations associated with all established radio bearers, and the like. Alternatively, the radio bearers do not include an SRB0.

Operation 3: indicating an indication to an NAS layer that the RRC connection reestablishment has fallen back.

Alternatively, operation 3 may be described as follows: RRC connection releasing and a cause of releasing of the RRC connection failure are indicated to the NAS layer. Operation 3 may further be described as follows: an RRC connection having been established is indicated to the NAS layer, and optionally, an establishment cause being RRC connection reestablishment fallback or an RRC connection reestablishment failure is further included. Operation 3 may further be described as follows: a request for establishment of a new RRC connection is transmitted to the NAS layer. The "establishment" can also be expressed as an "update."

Operation 4: resetting a MAC layer.

Operation 5: applying configurations included in the RRC connection establishment message. Preferably, the configurations include master cell group configurations and/or radio bearer configurations.

Operation 6: constructing an RRC connection establishment complete message and submitting the RRC connection establishment complete message to a lower layer for transmission, where the RRC connection establishment complete message is used to acknowledge/respond to the received RRC connection establishment message.

Operation 6 may be performed after step 4 for the following reason: if an RRC connection establishment complete message constructed by the UE at the time point has to include an NAS packet, then the RRC layer has to wait to receive the NAS packet from the NAS layer and add the NAS packet to the RRC connection establishment complete message, so as to complete construction of this message. Therefore, operation 6 can also be expressed as: waiting for an NAS packet from an upper layer, and adding the NAS packet to the RRC connection establishment complete message. The NAS packet is also referred to as NAS information received from the NAS layer.

Operation 7, performing an operation of leaving an RRC connected state (namely, an operation of entering an RRC idle state), where a cause for releasing is an RRC connection failure.

It should be noted that the present disclosure does not limit the sequence of the aforementioned plurality of operations.

In this step, the phrase "when the RRC connection establishment message is received" can also be expressed as "when the RRC connection establishment message is received and if reception of the RRC connection establishment message is a response to an RRC connection reestablishment request message."

Step 4: after the indication in operation 3 is received from the RRC layer, the NAS layer initiates an NAS connection recovery procedure so as to establish a new RRC connection and NAS connection. Optionally, establishment of an RRC connection may also be indicated to RRC, and/or an NAS packet is submitted to the RRC layer for transmission. Further, the NAS packet is an initial NAS message.

As described above, the NAS connection recovery procedure can be implemented through a registration update procedure (registration update), or a tracking area update procedure, or a service request procedure.

Embodiment 2

This embodiment provides a UE RRC state management method for fallback in an RRC connection reestablishment procedure.

In this embodiment, in an implementation manner, an RRC connection reestablishment procedure undergoing fallback includes an RRC connection establishment procedure after fallback (namely, a procedure of receiving an RRC connection establishment message and transmitting an RRC connection establishment complete message), and a UE RRC state remains unchanged, that is, UE remains in the RRC connected state.

In another implementation manner, in the RRC connection reestablishment procedure, if the UE receives the RRC connection establishment message for responding to an RRC connection reestablishment request message, then the UE enters the RRC idle state; after the UE performs operation 5 in embodiment 1 or the UE RRC layer receives NAS information from the NAS layer, the UE enters the RRC connected state.

Embodiment 3

This embodiment provides an implementation method of UE NAS layer for fallback in an RRC connection reestablishment procedure.

In this embodiment, if the UE NAS receives an indication from the RRC layer for indicating that RRC connection reestablishment has fallen back, then the UE enters the NAS idle state, and initiates an NAS connection recovery procedure. The embodiment can also be expressed as follows: if the UE NAS receives an RRC connection failure indication from the RRC layer, and establishment of a new RRC connection is requested, then the UE enters the NAS idle state, and initiates an NAS connection recovery procedure. The RRC connection failure indication can also be expressed as an indication for indicating that a new RRC connection has been established.

The NAS idle state refers to a 5G system Mobility Management idle mode/state (5GMM idle). Alternatively, the NAS idle state may also refer to an Evolved Packet System Mobility Management (EMM) idle state and/or an Evolved Packet System Connection Management (ECM) idle state. The "establishment" of the RRC connection can also be expressed as the "update."

Embodiment 4

This embodiment provides a method for processing an RRC connection establishment cause and access control information for fallback in an RRC connection reestablishment procedure.

In an implementation manner, in an NAS connection recovery procedure, if the NAS connection recovery procedure results from reception of an indication from the RRC layer for indicating that RRC connection reestablishment has fallen back, or from reception of an indication from the RRC layer for requesting establishment of a new RRC connection, or from reception of an indication from the RRC layer for indicating that a new RRC connection has been established, then the UE NAS layer does not need to provide an RRC connection establishment cause (RRC establishment cause) and/or access control information to the RRC layer.

In another implementation manner, in the RRC connection reestablishment procedure that has fallen back, if an RRC connection establishment cause and/or access control information is received from the NAS layer, then the UE RRC ignores the received RRC connection establishment cause and/or access control information. The "ignore" can also be expressed as "discard," "release," "do not execute," "skip" and the like.

In another implementation manner, in the RRC connection reestablishment procedure that has fallen back, if the UE receives an RRC connection establishment message from a base station for responding to an RRC connection reestablishment request message, then the UE adds an RRC connection establishment cause information element to an RRC connection establishment complete message, and submits the RRC connection establishment complete message to the base station. In the RRC connection reestablishment procedure that has fallen back, the RRC connection establishment complete message includes the RRC establishment cause. Preferably, the RRC connection establishment cause is acquired by the UE RRC layer from the UE NAS layer.

The access control information refers to access control information used for a current RRC connection establishment, and includes one or more of the following: an access category, an access class, an access identity, and a call type.

In the current 3GPP RAN2 discussion, one proposal is that RRC procedures/messages having similar functions are integrated into one procedure/message, so as to simplify drafting of the protocol or making the protocol easy to read. For example, the RRC connection reestablishment procedure and the RRC connection recovery procedure are integrated into one procedure. However, as previously described in the present disclosure, the two procedures are different from each other. Even if the two procedures are integrated into one procedure, the procedure needs to be implemented by using different methods for UE behaviors in different situations. The embodiment of the present disclosure is not only applicable to the case in which RRC connection reestablishment is a procedure independent of an RRC connection recovery procedure, but also applicable to the case in which the two are integrated into one procedure. For the latter case, in the present disclosure, the RRC connection reestablishment procedure can be expressed as an RRC procedure for implementing an RRC connection reestablishment function, and the RRC connection reestablishment request message can be expressed as an RRC message for requesting RRC connection reestablishment.

Embodiment 5

This embodiment provides an access control method in an RRC connection reestablishment procedure.

Step 1: a UE RRC layer initiates an RRC connection reestablishment procedure.

Step 2: the UE RRC layer instructs, to an NAS layer, initiation of the RRC connection reestablishment procedure.

Step 3: the UE NAS layer provides access control information to the UE RRC layer. The access control information refers to access control information used for a current RRC connection reestablishment, and includes one or more of the following: an access category, an access class, an access identity, and a call type. Optionally, the access control information further includes an establishment cause.

Step 4: the UE RRC layer performs an access control check according to the access control information acquired from the NAS layer and access control configurations received from a base station, and if a result of the access control check indicates a failure or if it is considered that access to this cell is barred, then UE ends the initiated RRC connection reestablishment procedure, which includes stopping a timer T301 and the like, and performs an operation of leaving an RRC connected state (that is, entering an RRC idle state or an RRC inactive state). If the result of the access control check indicates a success or if it is considered that access to this cell is not barred, then the UE continues performing the RRC connection reestablishment procedure.

The method used by the UE to perform the access control check is not limited by the present disclosure.

Embodiment 6

This embodiment provides a failure addressing method in an RRC connection reestablishment procedure.

In this embodiment, if a selected cell for the RRC connection reestablishment procedure is not suitable any longer (when T301 is running), then UE performs one or more of the following operations:

stopping T301, resetting MAC; and performing a cell re-selection or cell selection procedure, and if the cell re-selection or cell selection procedure includes a suitable cell, then selecting a suitable cell, and performing the RRC connection reestablishment procedure. The cell re-selection procedure may also be performed during running of T301, namely, in the RRC connection reestablishment procedure.

Figure 2:
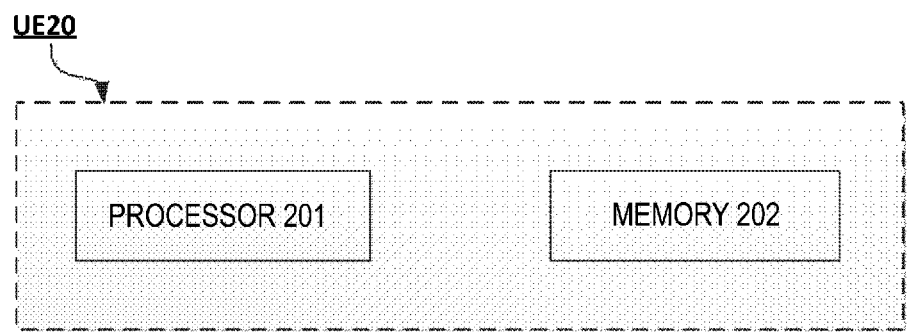
FIG. 2 shows a block diagram of user equipment 20 according to an embodiment of the present disclosure.

In addition, FIG. 2 shows a block diagram of user equipment 20 according to an embodiment of the present disclosure. As shown in FIG. 2, the user equipment 20 includes a processor 201 and a memory 202. The processor 201 may include, for example, a microprocessor, a microcontroller, an embedded processor and so on. The memory 202 may include, for example, a volatile memory (for example, a Random Access Memory (RAM)), a Hard Disk Drive (HDD), a non-volatile memory (for example, a flash memory), or other memory systems. Program instructions are stored on the memory 202. When executed by the processor 201, the instructions can perform the aforementioned control method in the user equipment as described in detail in the present disclosure.

In the present disclosure, RRC connection establishment may also be simply referred to as RRC establishment; RRC connection recovery may also be simply referred to as RRC recovery; RRC connection reestablishment may also be simply referred to as RRC reestablishment, and so on; that is, RRC connection may also be simply referred to as RRC; similarly, an RRC connection establishment message may also be simply referred to as an RRC establishment message; an RRC connection recovery message may also be simply referred to as an RRC recovery message; an RRC connection reestablishment message may also be simply referred to as an RRC reestablishment message, and so on.

In the present application, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present disclosure may be recorded on a computer-readable recording medium. The corresponding functions can be achieved by reading programs recorded on the recording medium and executing these programs by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the foregoing embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices mounted indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A User Equipment (UE), comprising:
a processor; and
a memory, wherein the memory stores instructions that, when executed by the processor, cause the UE to:
transmit a Radio Resource Control (RRC) connection reestablishment request message;
receive an RRC connection setup message in response to the RRC connection reestablishment request message, the RRC connection setup message being used to instruct the UE to establish a new RRC connection;
when an RRC layer of the UE receives the RRC connection setup message:
release radio resources including associated Radio Link Control (RLC) entities, Packet Data Convergence Protocol (PDCP) entities, and Service Data Adaptation Protocol (SDAP) for all established radio bearers which do not include a Signaling Radio Bearer 0 (SRB0),
indicate, by the RRC layer, an RRC connection reestablishment fallback indication to a Non-Access Stratum (NAS) layer of the UE,
apply configurations included in the RRC connection setup message, the configurations including master cell group configurations and radio bearer configuration, and
submit an RRC connection setup complete message to a lower layer for transmission; and
when the NAS layer receives the RRC connection reestablishment fallback indication from the RRC layer:
enter into a 5G system Mobility Management idle (5GMM-IDLE) mode, and
initiate a registration update procedure or a service request procedure.

2. A control method performed by a User Equipment (UE), the control method comprising:
transmitting a Radio Resource Control (RRC) connection reestablishment request message;
receiving an RRC connection setup message in response to the RRC connection reestablishment request message, the RRC connection setup message being used to instruct the UE to establish a new RRC connection;
when an RRC layer of the UE receives the RRC connection setup message:
releasing radio resources including associated Radio Link Control (RLC) entities, Packet Data Convergence Protocol (PDCP) entities, and Service Data Adaptation Protocol (SDAP) for all established radio bearers which do not include a Signaling Radio Bearer 0 (SRB0),
indicating, by the RRC layer, an RRC connection reestablishment fallback indication to a Non-Access Stratum (NAS) layer of the UE,
applying configurations included in the RRC connection setup message, the configurations including master cell group configurations and radio bearer configuration, and
submitting an RRC connection setup complete message to a lower layer for transmission; and
when the NAS layer receives the RRC connection reestablishment fallback indication from the RRC layer:
entering into a 5G system Mobility Management idle (5GMM-IDLE) mode; and
initiating a registration update procedure or a service request procedure.

* * * * *